United States Patent
Peng (10) Patent No.: US 11,317,041 B1
(45) Date of Patent: Apr. 26, 2022

(54) IMAGE-SENSING DEVICE AND METHOD OF BLACK-LEVEL CALIBRATION THEREOF

(71) Applicant: Silicon Optronics, Inc., Hsinchu (TW)

(72) Inventor: Sheng-Yi Peng, Hsinchu (TW)

(73) Assignee: SILICON OPTRONICS, INC., Hsinchu (TW)

( * ) Notice: Subject to any disclaimer, the term of this patent is extended or adjusted under 35 U.S.C. 154(b) by 0 days.

(21) Appl. No.: 17/246,931

(22) Filed: May 3, 2021

(30) Foreign Application Priority Data

Dec. 31, 2020 (TW) .............................. TW109147063

(51) Int. Cl.
  *H04N 5/355* (2011.01)
  *H04N 5/369* (2011.01)
  *H04N 5/3745* (2011.01)

(52) U.S. Cl.
  CPC ......... *H04N 5/355* (2013.01); *H04N 5/36963* (2018.08); *H04N 5/37455* (2013.01)

(58) Field of Classification Search
  CPC . H04N 5/355; H04N 5/36963; H04N 5/37455
  USPC ......................................................... 348/297
  See application file for complete search history.

(56) References Cited

U.S. PATENT DOCUMENTS

| 9,549,131 | B2 | 1/2017 | Idaka | |
| 10,104,321 | B1* | 10/2018 | Sohn | ..................... H04N 5/3765 |
| 2011/0032391 | A1* | 2/2011 | Cheung | ................. H04N 5/2176 348/E5.079 |
| 2011/0141291 | A1* | 6/2011 | Dong | ..................... H04N 5/361 348/187 |
| 2018/0176495 | A1* | 6/2018 | Shim | ....................... H04N 5/378 |
| 2019/0028665 | A1* | 1/2019 | Miyoshi | ............... H04N 5/3575 |

FOREIGN PATENT DOCUMENTS

TW            201304531 A       1/2013

OTHER PUBLICATIONS

Liu Tao et al., "Image Noise Removal Using Kalman Filter on Dark Frame", published dated Aug. 18, 2011 (Year: 2011).*

* cited by examiner

*Primary Examiner* — Lin Ye
*Assistant Examiner* — Chan T Nguyen
(74) *Attorney, Agent, or Firm* — Muncy, Geissler, Olds & Lowe, P.C.

(57) ABSTRACT

A method for black-level calibration for an image-sensing device is provided. The image-sensing device includes a pixel array that has a first non-light-sensing region, a second non-light-sensing region, and an image-pixel region. The method includes the following steps: receiving a first analog signal, a second analog signal, and a third analog signal respectively from the first non-light-sensing region, the second non-light-sensing region, and the image-pixel region every predetermined scanning period; utilizing an analog-to-digital converter (ADC) of the image-sensing device to convert the first analog signal, the second analog signal, and the third analog signal to a first digital signal, a second digital signal, and a third digital signal, respectively; and performing a black-level-calibration (BLC) process on the first digital signal, the second digital signal, and the third digital signal to generate a black-level-calibrated digital signal, wherein the BLC process is implemented using a Kalman filter.

14 Claims, 5 Drawing Sheets

IMAGE-SENSING DEVICE AND METHOD OF BLACK-LEVEL CALIBRATION THEREOF

CROSS REFERENCE TO RELATED APPLICATIONS

This Application claims priority of Taiwan Patent Application No. 109147063 filed on Dec. 31, 2020, the entirety of which is incorporated by reference herein.

BACKGROUND OF THE INVENTION

Field of the Invention

The present invention relates to image sensors, and, in particular, to an image-sensing device and a method of black-level calibration thereof.

Description of the Related Art

A photosensitive pixel in a complementary metal-oxide semiconductor (CMOS) image sensor can detect different brightness and wavelengths of light emitted by different objects to obtain corresponding analog signals (e.g., voltages), and the image sensor can convert analog signals into digital signals for subsequent signal processing.

However, due to thermal action of electrons, CMOS image sensors will still generate current even in the absence of light, which can be called dark current, and the dark current will be added to the sensing current while the image pixels are being exposed, resulting in inaccurate image brightness. However, today's image application scenarios are quite extensive, such as low-light-source scenes or being exposed to the sun (i.e., high-temperature scenes), the dark current (or regarded as the black level) measured from dark pixels of the CMOS image sensor will also jitter over time.

In a situation where the exposure value or gain value of the CMOS image sensor is switched, the signal reference and dark current generated by the CMOS image sensor will also change accordingly. Although the black level calibration (BLC) technology of the conventional image sensor can smooth the jitter changing over time to improve the black-level phenomenon caused by the dark current, the conventional BLC technology cannot respond to the aforementioned scenario of switching the exposure value or gain value, and it is easy to cause the estimation error of the dark current, which further affects the image quality of the CMOS image sensor.

BRIEF SUMMARY OF THE INVENTION

Accordingly, an image-sensing device and method of black-level calibration thereof are provided in the present invention to solve the aforementioned problem.

In an exemplary embodiment, an image-sensing device is provided. The image-sensing device includes a pixel array and a control circuit. The pixel array has a first non-light-sensing region, a second non-light-sensing region, and an image-pixel region. The control circuit is configured to receive a first analog signal, a second analog signal, and a third analog signal respectively from the first non-light-sensing region, the second non-light-sensing region, and the image-pixel region every predetermined scanning period. The control circuit includes an analog-to-digital converter (ADC) and a computation circuit. The ADC is configured to convert the first analog signal, the second analog signal, and the third analog signal to a first digital signal, a second digital signal, and a third digital signal, respectively. The computation circuit is configured to perform a black-level-calibration (BLC) process on the first digital signal, the second digital signal, and the third digital signal to generate a black-level-calibrated digital signal, wherein the BLC process is implemented using a Kalman filter.

In some embodiments, the first non-light-sensing region is an empty region or a first dark-pixel region, and an exposure time of the first dark-pixel region is 0. In some embodiments, the second non-light-sensing region is a second dark-pixel region, and the second dark-pixel region and the image-pixel region both comprise a plurality of color channels, and the first digital signal is a current average measured value of the empty region. In a current iteration in a current scanning period of the Kalman filter, the computation circuit further calculates an average value of pixels for each color channel in the second digital signal to obtain a current average measured value of the dark-pixel region for each color channel.

In some embodiments, the Kalman filter comprises a prediction stage and an update stage. In the prediction stage in the current iteration, for each color channel, the computation circuit performs an average-prediction process and a variance-prediction process, and the average-prediction process calculates $\hat{x}[n]=(x[n-1]-z_{ofst}[n-1])*\Delta e+z_{ofst}[n]$, and the variance-prediction process calculates $p[n]=p[n-1]*(\Delta e)^2+Q[n]$, wherein $\hat{x}[n]$ and $\hat{p}[n]$ denote a current black-level-calibrated predicted value and a current predicted variance value in the current iteration, respectively; $z_{ofst}[n]$ and $\Delta e$ denote the current average measured value of the empty-pixel region and an energy ratio, respectively; $x[n-1]$, $z_{ofst}[n-1]$, $p[n-1]$ denotes a previous black-level-calibrated estimated value, a previous average measured value of the empty region, and a previous estimated variance value in a previous iteration of a previous scanning period of the Kalman filter, respectively; $Q[n]$ denotes a process error variance of the image-sensing device.

In some embodiments, the image-sensing device has an exposure value and a gain value, wherein the energy ratio is a ratio of a first product of the exposure value and the gain value in the current iteration to a second product of the exposure value and the gain value in the previous iteration.

In some embodiments, the process error variance $Q[n]$ is a fixed value. In some other embodiments, when a dark current of the image-sensing device calculated by the computation circuit is smaller than a predetermined value, the process error variance $Q[n]$ is a fixed error value added to a quantization error or a rounding error.

In some embodiments, in the update process in the current iteration, for each color channel, the computation circuit performs a gain-calculation process, an average-update process, and a variance-update process, wherein the gain-calculation process calculates $$K = \frac{\hat{p}[n]}{\hat{p}[n] + R[n]},$$

and the average-update process calculates $x[n]=\hat{x}[n]+K(z_{ob}[n]-\hat{x}[n])$, and the variance-update process calculates $p[n]=(1-K)*\hat{p}[n]$, where K denotes the Kalman gain of the Kalman filter; $R[n]$, $x[n]$, $z_{ob}[n]$, and $p[n]$ denote a current measured variance value, a current black-level-calibration estimated value, the current average measured value in the dark-pixel region, and a current estimated variance in the current iteration of the image-sensing device.

In some embodiments, the computation circuit subtracts the current black-level-calibrated estimated value corresponding to each color channel from the pixel values for each color channel in the third digital signal to obtain the black-level-calibrated digital signal.

In another exemplary embodiment, a method for black-level calibration for an image-sensing device is provided. The image-sensing device includes a pixel array that has a first non-light-sensing region, a second non-light-sensing region, and an image-pixel region. The method includes the following steps: receiving a first analog signal, a second analog signal, and a third analog signal respectively from the first non-light-sensing region, the second non-light-sensing region, and the image-pixel region every predetermined scanning period; utilizing an analog-to-digital converter (ADC) of the image-sensing device to convert the first analog signal, the second analog signal, and the third analog signal to a first digital signal, a second digital signal, and a third digital signal, respectively; and performing a black-level-calibration (BLC) process on the first digital signal, the second digital signal, and the third digital signal to generate a black-level-calibrated digital signal, wherein the BLC process is implemented using a Kalman filter.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

It should be understood that the words "including". "including" and other words used in this specification are used to indicate the existence of specific technical features, values, method steps, operations, elements and/or components, but it is not excluded that more technical features, values, method steps, job processing, elements, components, or any combination of the above can be added.

Figure 1:
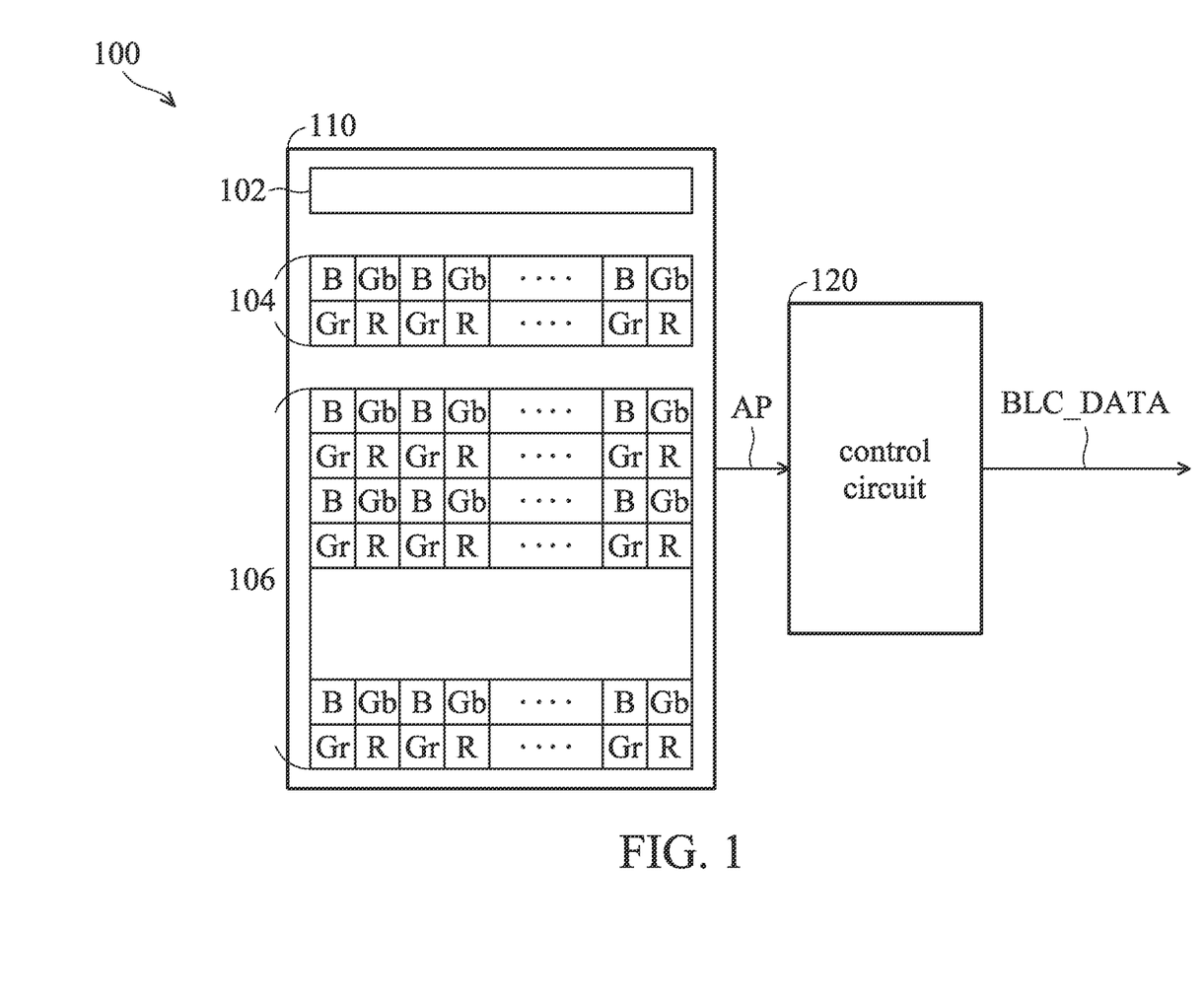
FIG. 1 is a diagram of an image-sensing device in accordance with an embodiment of the invention.

FIG. 1 is a diagram of an image-sensing device in accordance with an embodiment of the invention.

The image-sensing device 100, for example, may be a complementary metal-oxide semiconductor (CMOS) image sensor. As depicted in FIG. 1, the image-sensing device 100 may include a pixel array 110 and a control circuit 120.

The pixel array 110 may include a first non-light-sensing region 102, a second no-light-sensing region 104, and an image-pixel region 106. The second non-light-sensing region 104 and the image-pixel region 106 may respectively include a plurality of pixel sensors, such as pixel sensors B, R. Gb, and Gr, that are arranged in a predetermined manner (e.g., a Bayer pattern, not limited). The second non-light-sensing region 104 may be a dark-pixel region (e.g., a second dark-pixel region), and the pixel sensors in the second non-light-sensing region 104 is covered by a metal plate to isolate light. The pixel sensors in the image-pixel region 106 are not covered, and are used for image sensing. In some embodiments, the first non-light-sensing region 102 may be an empty-pixel region, and does not include any pixel sensor. The first non-light-sensing region 102 may include a detection circuit (not shown) to detect a signal offset of the image-sensing device 100. In some other embodiments, the first non-light-sensing 102 may be a dark-pixel region (e.g., a first dark-pixel region), and the exposure time of the first non-light-sensing region is 0 (or approximately close to 0) which is used to detect the signal offset of the image-sensing device 100, wherein the pixel sensors in the first non-light-sensing region 102 are covered by a metal plate to isolate light. For convenience of description, the first non-light-sensing region 102 and the second non-light-sensing region 104 are referred to as an empty-pixel region and a dark-pixel region in the following embodiments.

The control circuit 120 may receive a sensing signal AP (e.g., an analog signal) for each pixel from the pixel array 110, and convert the sensing signal AP to a digital signal, and perform a BLC process on different color channels in the digital signal to output a black-level-calibrated digital signal BLC_DATA that is transmitted to the subsequent image-processing circuit for image processing.

Figure 2:
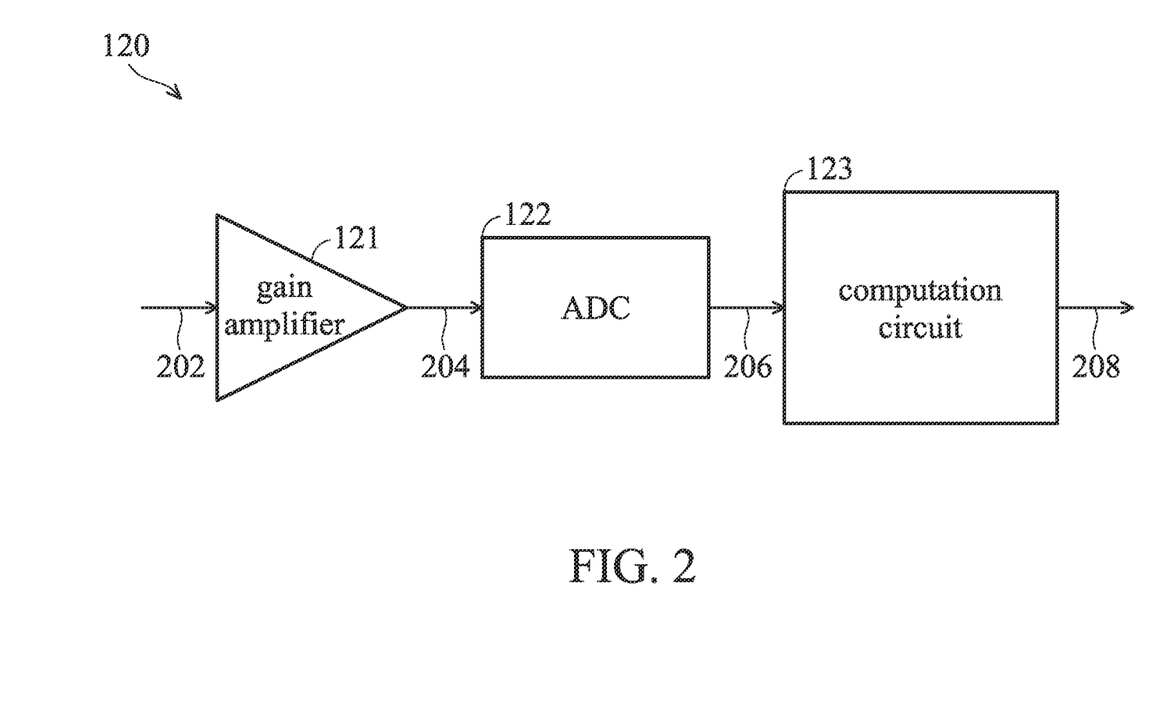
FIG. 2 is a diagram of the control circuit 120 in accordance with the embodiment of FIG. 1.

FIG. 2 is a diagram of the control circuit 120 in accordance with the embodiment of FIG. 1. Please refer to both FIG. 1 and FIG. 2.

In an embodiment, the control circuit 120 may include a gain amplifier 121, an analog-to-digital converter (ADC) 122, and a computation circuit 123. The control circuit 120 may receive a sensing signal 202 (e.g., an analog signal) from the pixel array 110, and the gain amplifier 121 may amplify the sensing signal 202 to generate an analog signal 204. The ADC 122 may convert the analog signal 204 to a digital signal 206. In some embodiments, the gain amplifier 121 can be omitted.

It should be noted that the computation circuit 123 may receive the sensing signal 202 from the pixel 110 with a predetermined capture rate (e.g., 30 frames per second) and a scan order (e.g., raster scan), and the sensing signal 202 may a first analog signal, a second analog signal, and a third analog signal respectively from the first non-light-sensing region 102, the second non-light-sensing region 104, and the image-pixel region 106. The second analog signal and the third analog signal may include the analog signal of each pixel in each color channel (e.g., color channels B. Gb, R, and Gr) in the second non-light-sensing region 104 and image-pixel region 106. The digital signal 206 may include the signal offset of the image-sensing device and the black level caused by the dark current.

The computation circuit 123 may perform the BLC process on the digital signal 206 to generate the black-level-calibrated digital signal 208. In some embodiments, the computation circuit 123 may be implemented using a hardware logic circuit, but the invention is not limited thereto. Specifically, the computation circuit 123 may perform the BLC process on the digital signal 206 by a Kalman filter. The computation circuit 123 may include plural sets of accumulators and simple dividing circuits to calculate the measured average value of all pixels in each color channel in the second non-light-sensing region 104 and image-pixel region 106 in the currently captured image.

The computation circuit 123 can perform the BLC process on different color channels. For convenience of description, the computation 123 perform the BLC process toward one color channel in the following embodiments.

Figure 3:
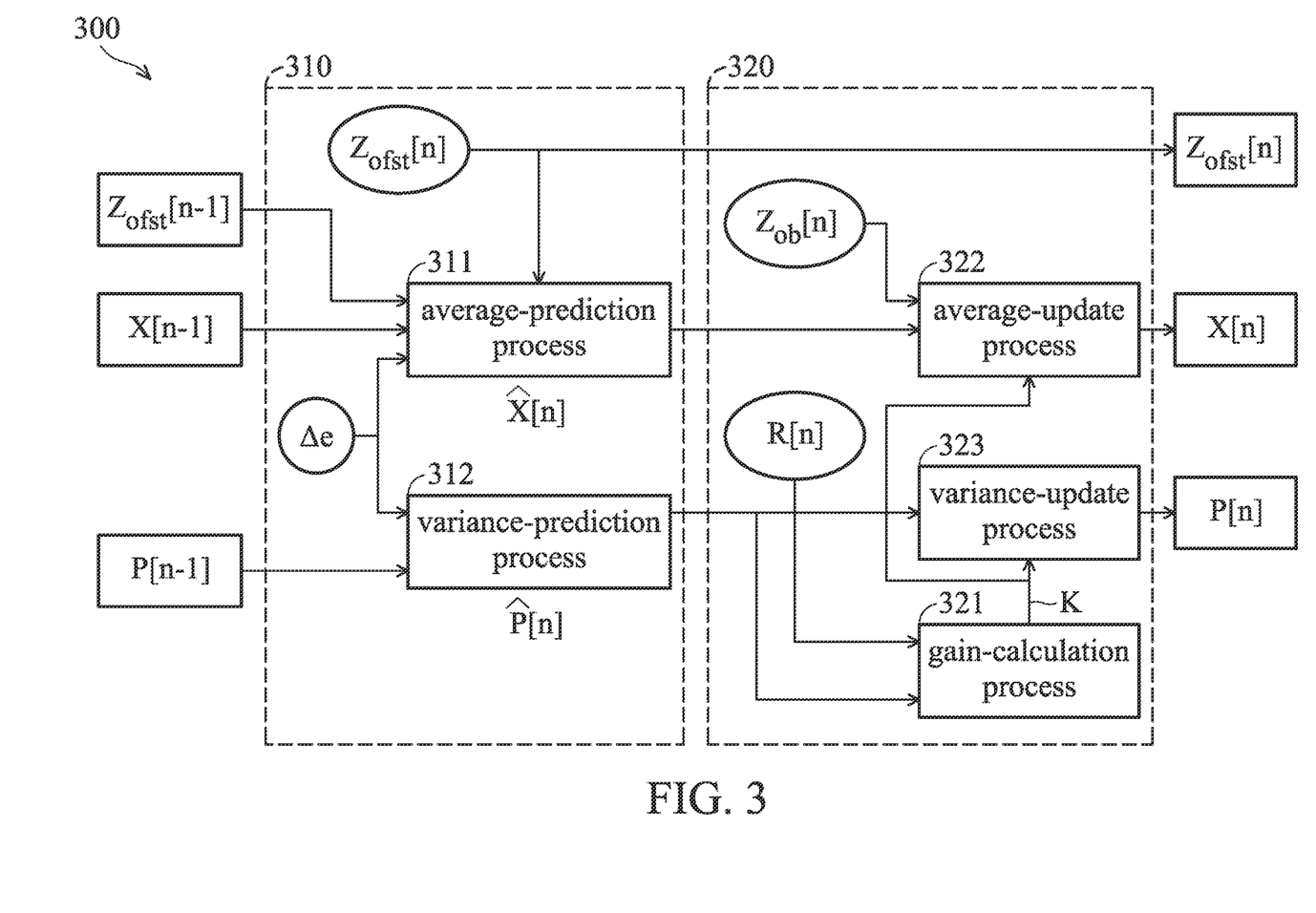
FIG. 3 is a diagram of the BLC process in accordance with an embodiment of the invention.

FIG. 3 is a diagram of the BLC process in accordance with an embodiment of the invention. Please refer to FIGS. 1 to 3.

In an embodiment, the Kalman filter 300 in the BLC process performed by the computation circuit 123 may include a prediction stage 310 and an update stage 320. The prediction stage 310 may predict a current estimated value using the previous predicted value and control parameters. The update stage 320 may calculate a weighted average using the current measured value and current estimated value to generate an updated estimated value (i.e., and output value). Briefly, the Kalman filter 300 may obtain the corresponding weighting value according to the variance itself. For example, if the Kalman gain is closer to 1, it means that the updated estimated value output by the Kalman 300 is closer to the current measured value. On the contrary, if the Kalman gain is farther from 1, it means that the updated estimated value output by the Kalman filter 300 is closer to the current predicted value.

In the following section, various parameters used in the Kalman filter 300 will be described first. $\hat{x}[n]$ represents the current black-level-calibrated predicted value (i.e., time t=n, which indicates the current iteration). $x[n]$ represents the current black-level-calibrated estimated value. $x[n-1]$ represents the previous black-level-calibrated estimated value (i.e., time=n-1, which indicates the previous iteration) that was updated by the previous black-level-calibrated predicted value $\hat{x}[n-1]$. "energy" represents the product of the gain value and exposure time of the image-sensing device 100. Ae represents an energy ratio, and $$\Delta e = \frac{energy[n]}{energy[n-1]},$$

which represents the ratio of the energy in the current iteration to the energy in the previous iteration. $\hat{p}[n]$ represents the current predicted variance value. $p[n]$ represents the current estimated variance value, that is updated by the current predicted variance value $\hat{p}[n]$. $p[n-1]$ represents the previous estimated variance value, that was updated by the previous predicted variance value $\hat{p}[n-1]$. $Z_{ob}[n]$ represents the average measured value of the current dark-pixel region, such as the average of the dark pixels in the same color channel measured in the dark-pixel region. $Z_{ofst}[n]$ represents the current average measured value of the empty-pixel region, which can present the signal offset of the image-sensing device 100. $R[n]$ represents the current measured variance value of the second non-light-sensing region 104 of the image-sensing device 100. K represents the Kalman filter which is a value between 0 and 1, and is used for update varies types of current average estimated values. $Q[n]$ represents the process error variance. $\varepsilon q$ represents the quantization error.

As depicted in FIG. 3, the prediction stage 310 may include an average-prediction process 311 and a variance-prediction process 312. The input parameters of the prediction stage 310 that are associated with the previous iteration may include: the previous average measured value of the empty-pixel region $Z_{ofst}[n-1]$, the previous BLC estimated value $x[n-1]$, and the previous estimated variance value $p[n-1]$. In addition, the prediction stage 310 may also use the current average measured value of the empty-pixel region $Z_{ofst}[n]$ and the energy ratio $\Delta e$.

The average-prediction process 311 may calculate the current BLC predicted value $\hat{x}[n]$ using the current average measured value of the empty-pixel region $Z_{ofst}[n]$, the previous average measured value of the empty-pixel region $Z_{ofst}[n-1]$, the previous BLC estimated value $x[n-1]$, and the energy ratio $\Delta e$. The average-prediction process 311 can be expressed by equation (1):

$$\hat{x}[n]=(x[n-1]-z_{ofst}[n-1])*\Delta e+z_{ofst}[n] \quad (1)$$

It should be noted that, for each color channel, the average estimated value of the dark-pixel region and the average measured value of the dark-pixel region both include the signal offset. Therefore, if the previous average measured value of the empty-pixel region $z_{ofst}[n-1]$ is subtracted from the previous BLC estimated value $x[n-1]$, the dark current of the previous iteration can be obtained.

In addition, the dark current of the image-sensing device 100 may exhibits a linear relationship with the exposure value and gain value, which means that the greater the exposure value/gain value of the image-sensing device 100, the greater linear increment of the dark current. In equation (1), the dark current of the previous iteration (i.e., $x[n-1]-z_{ofst}[n-1]$) is multiplied with the energy ratio $\Delta e$, the predicted dark current of the current iteration can be calculated. Accordingly, the computation circuit 123 may add the current average measured value of the empty-pixel region $Z_{ofst}[n]$ to the predicted dark current of the current iteration to obtain the current predicted value of the dark-pixel region $\hat{x}[n]$.

The variance-prediction process 312 can be expressed by equation (2):

$$\hat{p}[n]=p[n-1]*(\Delta e)^2+Q[n] \quad (2)$$

It should be noted that the digital signal generated by an analog signal with a very small amplitude that passes through the ADC 122 is likely to get a digital value close to 0, and when the digital signal is multiplied with a very large digital gain value, it will cause great errors. Accordingly, in some embodiments, the computation circuit 123 will add a fixed error value to the process error variance $Q[n]$ to prevent the current predicted variance value $\hat{p}[n]$ from being equal to 0 or close to 0 after each iteration, which indicates an unreasonable value in a real system. In some other embodiments, when the value of the dark current is very small (e.g., smaller than a predetermined value), the process error variance $Q[n]$ is additionally added to quantization error $\varepsilon_q$ or a rounding error.

As depicted in FIG. 3, the update stage 320 may include a gain-calculation process 321, an average-update process 322, and a variance-update process 323. The gain-calculation process 321 may calculate the Kalman gain K according to the current predicted variance $\hat{p}[n]$ and the current measured variance $R[n]$. For example, the gain-calculation process 321 can be expressed by equation (3):

$$K = \frac{\hat{p}[n]}{\hat{p}[n]+R[n]} \quad (3)$$

The average-update process 322 may calculate the black-level-calibrated estimated value $x[n]$ according to the Kalman gain K, the current black-level-calibrated predicted value x̂[n], and the current average measured value of the dark-pixel region $Z_{ob}[n]$. For example, the average-update process 322 can be expressed by equation (4):

$$x[n]=\hat{x}[n]+K(z_{ob}[n]-\hat{x}[n]) \quad (4)$$

Specifically, when the value of the current measured variance R[n] is very small, the Kalman gain K calculated by the computation circuit 123 will be close to 1, and it indicates that the black-level-calibrated estimated value x[n] output by the average-update process 322 in the Kalman filter 300 is closer to the current average measured value of the dark-pixel region $Z_{ob}[n]$. When the value of the current measured variance R[n] is very large, the Kalman gain K calculated by the computation circuit 123 is much smaller than 1, which means that the current black-level-calibrated estimated value x[n] output by the average-update process 322 in the Kalman filter 300 is closer to the current black-level-calibrated predicted value x[n].

The variance-update process 323 may calculate the current estimated variance p[n] according to the Kalman gain K and the current predicted variance p̂[n]. For example, the variance-update process 323 can be expressed by equation (5):

$$p[n]=(1-K)*\hat{p}[n] \quad (5)$$

Specifically, when the value of the current measured variance R[n] is very small, the Kalman gain K calculated by the computation circuit 123 will be close to 1, and it indicates that the current estimated variance p[n] output by the variance-update process 323 in the Kalman filter 300 becomes smaller. When the value of the current measured variance R[n] is very large, the Kalman gain K calculated by the computation circuit 123 is much smaller than 1, which means that the current estimated variance p[n] output by the variance-update process 323 in the Kalman filter 300 is closer to the current predicted variance p̂[n].

At last, the computation circuit 123 may store the current average measured value of the empty-pixel region $Z_{ofst}[n]$, current black-level-calibrated estimated value x[n], and current estimated variance p[n] output by the Kalman filter 300, and use these stored parameters in the prediction stage 310 and updating stage 320 in the subsequent iteration. That is, the aforementioned parameters $Z_{ofst}[n]$, x[n], and p[n] generated in the current iteration will become the previous average measured value of the empty-pixel region $Z_{ofst}[n-1]$, previous black-level-calibrated estimated value x[n−1], and previous estimated variance p[n−1], respectively.

Figure 4A:
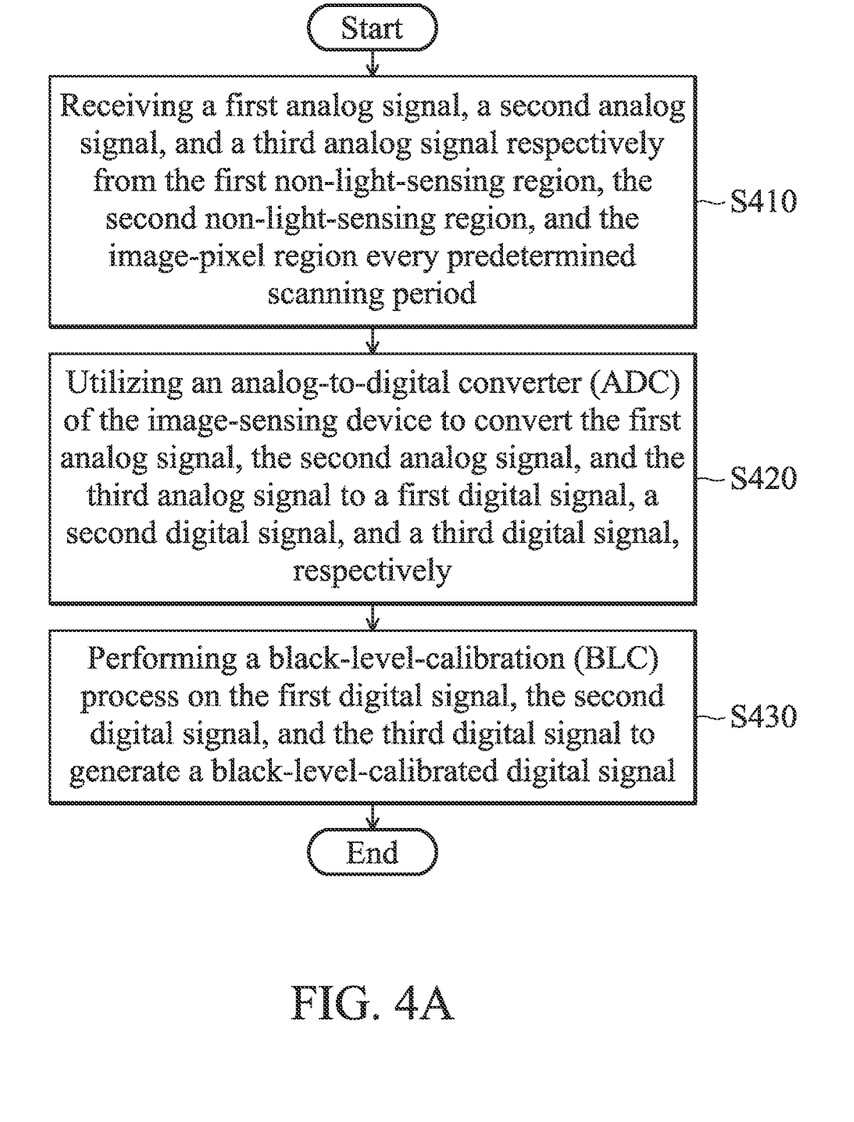
FIG. 4A is a flow chart of a method of calibrating black level calibration for used in an image-sensing device in accordance with an embodiment of the invention.

FIG. 4A is a flow chart of a method of calibrating black level calibration for used in an image-sensing device in accordance with an embodiment of the invention.

In step S410, a first analog signal, a second analog signal, and a third analog signal respectively from the first non-light-sensing region 102, the second non-light-sensing region 104, and the image-pixel region 106 are received every predetermined scanning period. For example, the pixel array 110 of the image-sensing device 100 may perform scanning with a predetermined capture frame rate (e.g., 30 frames per second) and a scanning order (e.g., raster scan), and thus the control circuit 120 may receive the first analog signal, the second analog signal, and the third analog signal respectively from the first non-light-sensing region 102, the second non-light-sensing region 104, and the image-pixel region 106 every predetermined scanning period (e.g., 1/30 second).

In step S420, the ADC 122 of the image-sensing device 100 is used to convert the first analog signal, the second analog signal, and the third analog signal to a first digital signal, a second digital signal, and a third digital signal, respectively. For example, the first digital signal may be the signal offset value detected from the first non-light-sensing region 102, such as the current average measured value of the empty-pixel region $Z_{ofst}[n]$. The second digital signal may include pixel values in each color channel of the second non-light-sensing region 104. The third digital signal may include pixel values in each color channel of the image-pixel region 106.

In step S430, a black-level-calibration process is performed on the first digital signal, the second digital signal, and the third digital signal to generate a black-level-calibrated digital signal, wherein the black-level-calibration process is a Kalman filter. The Kalman filter 300 may be repeatedly executed. For example, the current scanning period may be referred to as the current iteration, and the previous scanning period may be referred to as the previous iteration. In the embodiment of FIG. 4A, the method of black-level calibration is used in the current iteration of the current scanning period.

Figure 4B:
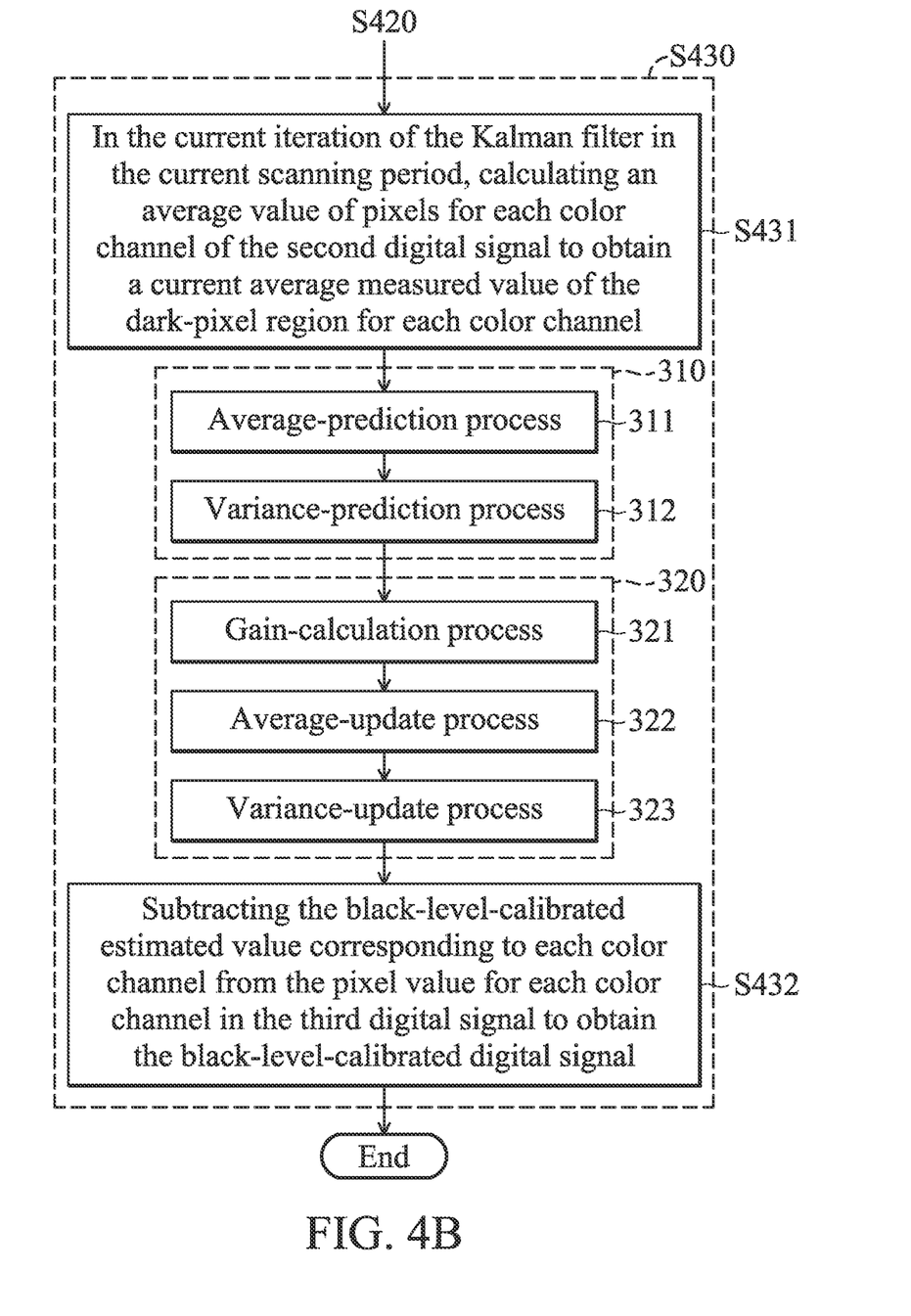
FIG. 4B is a flow chart of step S430 in accordance with the embodiment of FIG. 4A.

FIG. 4B is a flow chart of step S430 in accordance with the embodiment of FIG. 4A.

In step S431, in the current iteration of the Kalman filter in the current scanning period, an average value of pixels for each color channel of the second digital signal is calculated to obtain a current average measured value of the dark-pixel region for each color channel.

After step S431, the prediction stage 310 and update stage 320 of the Kalman filter 300 are performed, wherein the prediction stage 310 may include an average-prediction process 311 and a variance-prediction process 312, and the update stage 320 may include a gain-calculation process 321, an average-update process 322, and a variance-update process 323. For example, the details for various processes in the prediction stage 310 and the update stage 320 can be referred to the embodiment of FIG. 3. In some embodiments, the order of the average-prediction process 311 and the variance-prediction process 312 can be exchanged or the processes 311 and 312 can be performed simultaneously. The order of the average-update process 322 and the variance-update process 323 can be exchanged, or the processes 322 and 323 can be performed simultaneously.

In step S432, the black-level-calibrated estimated value corresponding to each color channel is subtracted from the pixel value for each color channel in the third digital signal to obtain the black-level-calibrated digital signal. For example, the current black-level-calibrated estimated value x[n] generated by the average-update process 322 can be used as the black-level-calibration value in the BLC process in the current iteration, and thus the computation circuit 123 may subtract the current black-level-calibrated estimated value x[n] from each pixel value in the image-pixel region 106, thereby eliminating the influence of the dark current on each pixel value, so the image quality of the image captured by the image-sensing device 100 can be further improved.

In view of the above, an image-sensing device and a method of black-level calibration thereof are provided in the present invention, which is capable of performing the BLC process on the image signal in the digital domain by the Kalman filter. In addition, the Kalman filter may further consider the exposure value and gain value of the image-sensing device. When the exposure value or the gain value of the image-sensing device changes drastically (e.g., set by the user) or the image-sensing device is in a high-temperature environment or a low-light-source environment, the BLC process of the present invention is still capable of accurately estimate the dark current of the image-sensing device, without being affected by the drastic changes in the exposure value or gain value, or the high-temperature environment or low-light-source environment. Therefore, the image quality and consistency of the output image signal of the image-sensing device can be further improved.

Words such as "first", "second", and "third" used in the claims are used to modify the elements in the claims, and are not used to indicate that there is an order of priority, antecedent relationship, or One element precedes another element, or the chronological order of method steps, only used to distinguish elements with the same name.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image-sensing device, comprising:
a pixel array, comprising a first non-light-sensing region, a second non-light-sensing region, and an image-pixel region; and
a control circuit, configured to receive a first analog signal, a second analog signal, and a third analog signal respectively from the first non-light-sensing region, the second non-light-sensing region, and the image-pixel region every predetermined scanning period, wherein the control circuit comprises:
an analog-to-digital converter (ADC), configured to convert the first analog signal, the second analog signal, and the third analog signal to a first digital signal, a second digital signal, and a third digital signal, respectively; and
a computation circuit, configured to perform a black-level-calibration (BLC) process on the first digital signal, the second digital signal, and the third digital signal to generate a black-level-calibrated digital signal,
wherein the BLC process is implemented using a Kalman filter,
wherein the first non-light-sensing region is an empty region or a first dark-pixel region, and exposure time of the first dark-pixel region is 0,
wherein the second non-light-sensing region is a second dark-pixel region, and the second dark-pixel region and the image-pixel region both comprise a plurality of color channels, and the first digital signal is a current average measured value of the empty region,
wherein, in a current iteration in a current scanning period of the Kalman filter, the computation circuit further calculates an average value of pixels for each color channel in the second digital signal to obtain a current average measured value of the dark-pixel region for each color channel.

2. The image-sensing device as claimed in claim 1, wherein the Kalman filter comprises a prediction stage and an update stage,
wherein in the prediction stage in the current iteration, for each color channel, the computation circuit performs an average-prediction process and a variance-prediction process, and the average-prediction process calculates $\hat{x}[n]=(x[n-1]-z_{ofst}[n-1])*\Delta e+z_{ofst}[n]$, and the variance-prediction process calculates $\hat{p}[n]=p[n-1]*(\Delta e)^2+Q[n]$,
wherein $\hat{x}[n]$ and $\hat{p}[n]$ denote a current black-level-calibrated predicted value and a current predicted variance value in the current iteration, respectively; $z_{ofst}[n]$ and $\Delta e$ denote the current average measured value of the empty-pixel region and an energy ratio, respectively; $x[n-1]$, $z_{ofst}[n-1]$, $p[n-1]$ denotes a previous black-level-calibrated estimated value, a previous average measured value of the empty region, and a previous estimated variance value in a previous iteration of a previous scanning period of the Kalman filter, respectively; $Q[n]$ denotes a process error variance of the image-sensing device.

3. The image-sensing device as claimed in claim 2, wherein the image-sensing device has an exposure value and a gain value, wherein the energy ratio is a ratio of a first product of the exposure value and the gain value in the current iteration to a second product of the exposure value and the gain value in the previous iteration.

4. The image-sensing device as claimed in claim 2, wherein the process error variance $Q[n]$ is a fixed value.

5. The image-sensing device as claimed in claim 2, wherein when a dark current of the image-sensing device calculated by the computation circuit is lower than a predetermined value, the process error variance $Q[n]$ is a fixed error value added to a quantization error or a rounding error.

6. The image-sensing device as claimed in claim 2, wherein in the update process in the current iteration, for each color channel, the computation circuit performs a gain-calculation process, an average-update process, and a variance-update process, wherein the gain-calculation process calculates $$K = \frac{\hat{p}[n]}{\hat{p}[n] + R[n]},$$

and the average-update process calculates $x[n]=\hat{x}[n]+K(z_{ob}[n]-\hat{x}[n])$, and the variance-update process calculates $p[n]=(1-K)*\hat{p}[n]$,
where K denotes the Kalman gain of the Kalman filter; $R[n]$, $x[n]$, $z_{ob}[n]$, and $p[n]$ denote a current measured variance value, a current black-level-calibration estimated value, the current average measured value in the dark-pixel region, and a current estimated variance in the current iteration of the image-sensing device.

7. The image-sensing device as claimed in claim 6, wherein the computation circuit subtracts the current black-level-calibrated estimated value corresponding to each color channel from the pixel values for each color channel in the third digital signal to obtain the black-level-calibrated digital signal.

8. A method for black-level calibration for an image-sensing device, wherein the image-sensing device comprises a pixel array that comprises a first non-light-sensing region, a second non-light-sensing region, and an image-pixel region, the method comprising:
receiving a first analog signal, a second analog signal, and a third analog signal respectively from the first non-light-sensing region, the second non-light-sensing region, and the image-pixel region every predetermined scanning period;
utilizing an analog-to-digital converter (ADC) of the image-sensing device to convert the first analog signal, the second analog signal, and the third analog signal to a first digital signal, a second digital signal, and a third digital signal, respectively; and performing a black-level-calibration (BLC) process on the first digital signal, the second digital signal, and the third digital signal to generate a black-level-calibrated digital signal, wherein the BLC process is implemented using a Kalman filter, wherein the first non-light-sensing region is an empty region or a first dark-pixel region, and exposure time of the first dark-pixel region is 0, wherein the second non-light-sensing region is a second dark-pixel region, and the second dark-pixel region and the image-pixel region both comprise a plurality of color channels, and the first digital signal is a current average measured value of the empty region, wherein the step of performing a the BLC process on the first digital signal, the second digital signal, and the third digital signal to generate a black-level-calibrated digital signal comprises:

in a current iteration in a current scanning period of the Kalman filter, calculating an average value of pixels for each color channel in the second digital signal to obtain a current average measured value of the dark-pixel region for each color channel.

9. The method as claimed in claim 8, wherein the Kalman filter comprises a prediction stage and an update stage, wherein the step of performing a the BLC process on the first digital signal, the second digital signal, and the third digital signal to generate a black-level-calibrated digital signal further comprises:

in the prediction stage in the current iteration, for each color channel, performing an average-prediction process and a variance-prediction process, wherein the average-prediction process calculates $\hat{x}[n]=(x[n-1]-z_{ofst}[n-1])*\Delta e+z_{ofst}[n]$, and the variance-prediction process calculates $\hat{p}[n]=p[n-1]*(\Delta e)^2+Q[n]$, wherein $\hat{x}[n]$ and $\hat{p}[n]$ denote a current black-level-calibrated predicted value and a current predicted variance value in the current iteration, respectively; $z_{ofst}[n]$ and $\Delta e$ denote the current average measured value of the empty-pixel region and an energy ratio, respectively; $x[n-1]$, $z_{ofst}[n-1]$, $p[n-1]$ denotes a previous black-level-calibrated estimated value, a previous average measured value of the empty region, and a previous estimated variance value in a previous iteration of a previous scanning period of the Kalman filter, respectively; Q[n] denotes a process error variance of the image-sensing device.

10. The method as claimed in claim 9, wherein the image-sensing device has an exposure value and a gain value, wherein the energy ratio is a ratio of a first product of the exposure value and the gain value in the current iteration to a second product of the exposure value and the gain value in the previous iteration.

11. The method as claimed in claim 9, wherein the process error variance Q[n] is a fixed value.

12. The method as claimed in claim 9, wherein when a dark current of the image-sensing device calculated by the computation circuit is smaller than a predetermined value, the process error variance Q[n] is a fixed error value added to a quantization error or a rounding error.

13. The method as claimed in claim 9, wherein the step of performing a the BLC process on the first digital signal, the second digital signal, and the third digital signal to generate a black-level-calibrated digital signal further comprises:

in the update process in the current iteration, for each color channel, performing a gain-calculation process and an average-update process, and a variance-update process, wherein the gain-calculation process calculates $$K = \frac{\hat{p}[n]}{\hat{p}[n] + R[n]},$$

and the average-update process calculates $x[n]=\hat{x}[n]+K(z_{ob}[n]-\hat{x}[n])$, and the variance-update process calculates $p[n]=(1-K)*\hat{p}[n]$, where K denotes the Kalman gain of the Kalman filter; R[n], x[n], $z_{ob}[n]$, and p[n] denote a current measured variance value, a current black-level-calibration estimated value, the current average measured value in the dark-pixel region, and a current estimated variance in the current iteration of the image-sensing device.

14. The method as claimed in claim 13, wherein the step of performing a BLC process on the first digital signal, the second digital signal, and the third digital signal to generate a black-level-calibrated digital signal further comprises:

subtracting the current black-level-calibrated estimated value corresponding to each color channel from the pixel values for each color channel in the third digital signal to obtain the black-level-calibrated digital signal.

* * * * *